(12) United States Patent
Fukui

(10) Patent No.: US 8,788,833 B2
(45) Date of Patent: *Jul. 22, 2014

(54) ELECTRONIC APPARATUS AND COMMUNICATION CONTROL METHOD

(71) Applicant: Kabushiki Kaisha Toshiba, Tokyo (JP)

(72) Inventor: Kotaro Fukui, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,623

(22) Filed: Jun. 20, 2013

(65) Prior Publication Data

US 2013/0283355 A1    Oct. 24, 2013

Related U.S. Application Data

(63) Continuation of application No. 12/873,637, filed on Sep. 1, 2010, now Pat. No. 8,516,263.

(30) Foreign Application Priority Data

Sep. 18, 2009 (JP) ................................. 2009-217942

(51) Int. Cl.
*H04L 29/00* (2006.01)

(52) U.S. Cl.
USPC ........... 713/182; 713/183; 713/184; 713/185; 713/186

(58) Field of Classification Search
USPC ................................................ 713/183–186
See application file for complete search history.

(56) References Cited

U.S. PATENT DOCUMENTS

| 7,904,237 B2 | 3/2011 | Amano et al. |
| 2008/0040274 A1 | 2/2008 | Uzo |
| 2008/0051986 A1 | 2/2008 | Amano et al. |
| 2008/0222711 A1* | 9/2008 | Michaelis ...................... 726/7 |
| 2009/0177801 A1* | 7/2009 | Chambers et al. ............ 709/250 |
| 2011/0010517 A1 | 1/2011 | Fujimura et al. |

FOREIGN PATENT DOCUMENTS

| JP | 2007-18398 A | 1/2007 |
| JP | 2008-052408 A | 3/2008 |
| JP | 2009-211545 A | 9/2009 |

OTHER PUBLICATIONS

First Office Action mailed by Japan Patent Office on Nov. 9, 2010 in the corresponding Japanese patent application No. 2009-217942.
Notice of Reasons for Rejection mailed by Japan Patent Office on Nov. 22, 2011 in a corresponding Japanese patent application No. 2011-097419, which is a divisional application of JP 2009-217972.

* cited by examiner

*Primary Examiner* — Ghazal Shehni
(74) *Attorney, Agent, or Firm* — Knobbe, Martens, Olson & Bear LLP

(57) ABSTRACT

According to one embodiment, an electronic apparatus comprises a communication module and a connection control module. The communication module is configured to execute close proximity wireless transfer. The connection control module is configured to start an operation of establishing a connection between the communication module and an external device which is in close proximity to the communication module if an identifier of the external device wirelessly transmitted from the external device is included in a connection permission list. The connection control module is configured to display a password entry screen if the identifier is not included in the connection permission list, and to add, if a password entered on the password entry screen matches with a registered password, the identifier to the connection permission list and start the operation of establishing the connection between the communication module and the external device.

8 Claims, 9 Drawing Sheets

ELECTRONIC APPARATUS AND COMMUNICATION CONTROL METHOD

CROSS-REFERENCE TO RELATED APPLICATIONS

This application is a continuation of U.S. patent application Ser. No. 12/873,637 filed Sep. 1, 2013, which is based upon and claims the benefit of priority from Japanese Patent Application No. 2009-217942, filed Sep. 18, 2009, the entire contents of each of which are incorporated herein by reference.

FIELD

Embodiments described herein relate generally to an electronic apparatus which executes close proximity wireless transfer, and a communication control method which is applied to the electronic apparatus.

BACKGROUND

In recent years, in IC cards, mobile phones, etc., wireless communication such as near field communication (NFC) has begun to be used. A user can easily execute communication for an authentication process, an accounting process, etc., simply by performing an operation of holding the IC card or mobile phone over a reader/writer module of a host apparatus.

Recently, a novel close proximity wireless transfer technology, which enables communication at high speed, has begun to be developed. In this novel close proximity wireless transfer technology, not only authentication and accounting services can be performed between the devices, but also data files of text data, video data and audio data can be exchanged between the devices.

The communication range of close proximity wireless transfer is limited to a short range of, e.g. several centimeters. This short range can reduce the risk of data theft in data communication between two devices. Thus, in the close proximity wireless transfer, security of a certain level can be ensured without performing, between devices, special communication for pairing or inter-device authentication.

However, if data exchange between devices is unconditionally permitted by using, as a trigger, only a touch operation of bringing a certain device close to another device, it is possible that the data in the device, such as a computer, is stolen by a malicious third party. For example, if a malicious third party performs an operation of bringing a device, which is owned by the malicious third party, close to a computer of a certain user, it is possible that the data in the computer is stolen.

Jpn. Pat. Appln. KOKAI Publication No. 2007-18398 discloses such a control technique that in an automatic teller machine (ATM) having a general-purpose I/F for an operation by a maintenance worker, a device which is connected to the general-purpose I/F is registered in advance in the automatic teller machine (ATM), so that devices other than the registered device cannot be used.

In the technique of KOKAI Publication No. 2007-18398, however, the automatic teller machine cannot communicate at all with devices which are not registered as the device that is to be connected.

In the close proximity wireless transfer, it is possible that various kinds of electronic devices, such as mobile phones, digital cameras, PDAs and other countless mobile devices, become objects of communication. Therefore, as a security function that is applied to the close proximity wireless transfer, a scheme is needed to permit, where necessary, a connection to a device, which is not pre-registered as a device that is the object of connection, thereby not to lose the usability of the close proximity wireless transfer.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus comprises a communication module and a connection control module. The communication module is configured to execute close proximity wireless transfer. The connection control module is configured to start an operation of establishing a connection between the communication module and an external device which is in close proximity to the communication module if an identifier of the external device wirelessly transmitted from the external device is included in a connection permission list. The connection control module is configured to display a password entry screen if the identifier is not included in the connection permission list, and to add, if a password entered on the password entry screen matches with a registered password, the identifier to the connection permission list and start the operation of establishing the connection between the communication module and the external device.

Figure 1:
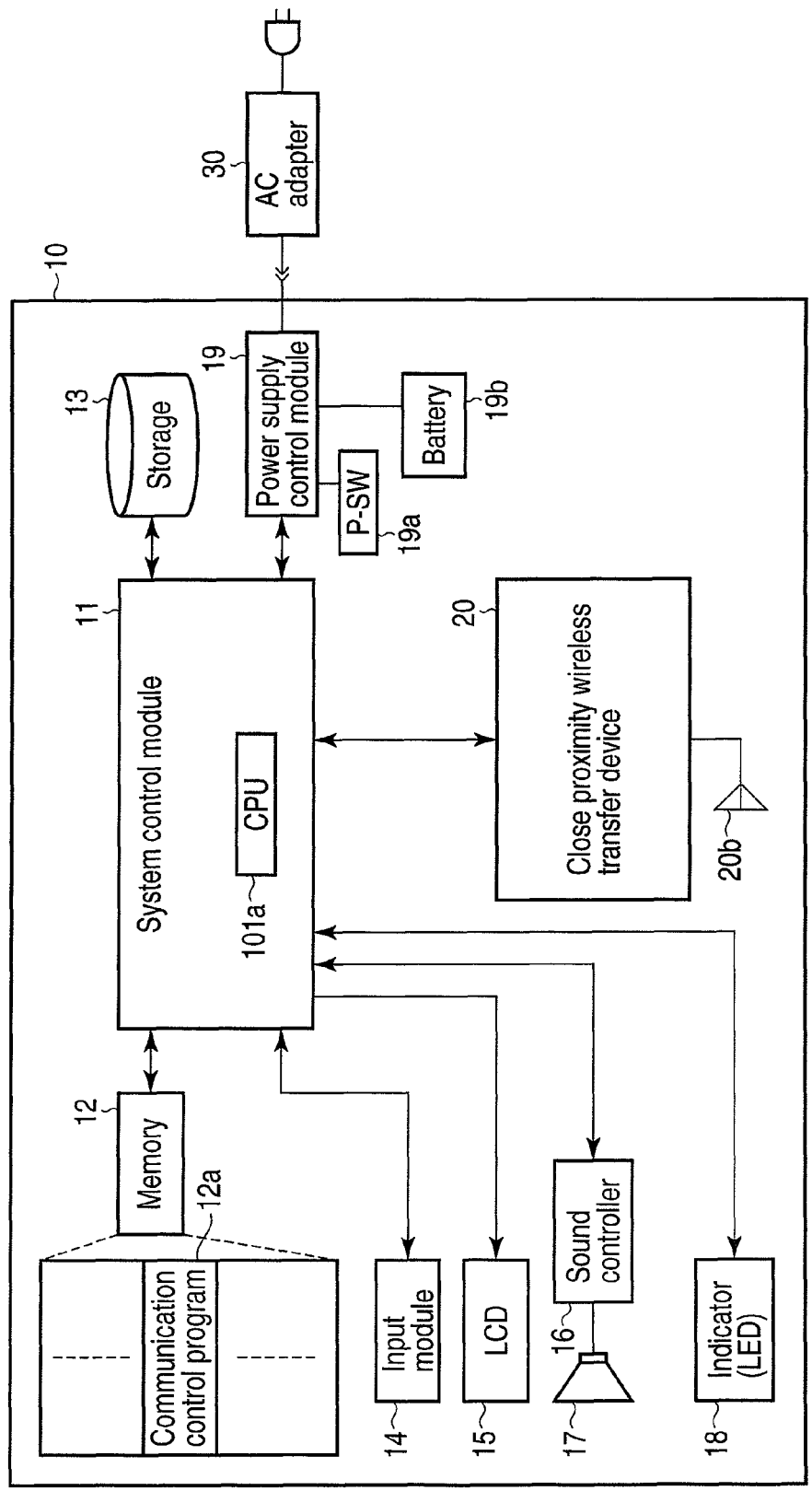
FIG. 1 is an exemplary block diagram showing the system configuration of an electronic apparatus according to an embodiment.

FIG. 1 shows the structure of an electronic apparatus according to an embodiment. The electronic apparatus 10 is realized, for example, as a portable computer, a mobile phone, a PDA, an audio player, or a TV. The electronic apparatus 10 includes a system control module 11, a memory 12, a storage device 13, an input module 14, a liquid crystal display (LCD) 15, a sound controller 16, a speaker 17, an indicator 18, a power supply control module 19, and a close proximity wireless transfer device 20.

The system control module 11 controls the operations of the respective components in the electronic apparatus 10. The system control module 11 is connected to the memory 12, storage device 13, input module 14, LCD 15, sound controller 16, indicator 18, power supply control module 19 and close proximity wireless transfer device 20. The system control module 11 includes a CPU 101a.

The CPU 101a is a processor which executes an operating system and various application programs/utility programs, which are loaded from the storage device 13 into the memory 12. The application programs/utility programs include a communication control program 12a for controlling the communication operation of the close proximity wireless transfer device 20.

The communication control program 12a has a function of discriminating an identifier (unique ID) of each of devices (external devices), and enables the user to select an external device which can establish a connection to the close proximity wireless transfer device 20. The unique ID of the external device, which has been permitted to establish a connection to the close proximity wireless transfer device 20, is registered in a connection permission list. If the unique ID, which is wirelessly transmitted from an external device A to the close proximity wireless transfer device 20, is registered in the connection permission list, the communication control program 12a immediately starts an operation for establishing a connection between the close proximity wireless transfer device 20 and the external device A, thereby to execute data transfer between the close proximity wireless transfer device 20 and the external device A. The connection permission list can restrict external devices, which can establish a connection to the close proximity wireless transfer device 20 (i.e., the electronic apparatus 10), to some specific devices.

However, if a third party, for example, operates the electronic apparatus 10 without prior consent, and registers the unique ID of an unlawful external device B in the connection permission list, it is possible that the data in the electronic apparatus 10 is stolen. The reason is that the connection between the external device B and electronic apparatus 10 is established if the third party simply touches the external device B to the electronic apparatus 10, and data exchange between the devices may possibly be started.

The communication control program 12a has a function of preventing the unique ID of an unlawful external device from being registered in the connection permission list with use of password verification. To be more specific, when the communication control program 12a has received the unique ID of an external device A, which is wirelessly transmitted from the external device A that is in close proximity to the electronic apparatus 10, the communication control program 12a determines whether the received unique ID is registered in the connection permission list. If the received unique ID is not registered in the connection permission list, the communication control program 12a recognizes that the external device A is a device which has first been touched to the electronic apparatus 10. In this case, to begin with, the communication control program 12a displays on the LCD 15 a screen (password entry screen) for prompting the entry of the password. Only when the entered password is valid, that is, only when the entered password matches with the password (registered password) which is already registered in the electronic apparatus 10, the communication control program 12a registers the received unique ID, i.e. the unique ID of the external device A, in the connection permission list. Then, in order to execute data transfer between the close proximity wireless transfer device 20 and external device A, the communication control program 12a starts the operation for establishing a connection between the close proximity wireless transfer device 20 and external device A.

On the other hand, if the entered password is invalid, the communication control program 12a does not register the unique ID of the external device A in the connection permission list. No connection is established between the close proximity wireless transfer 20 and external device A, and accordingly no data exchange is executed between the close proximity wireless transfer 20 and external device A.

Hence, even if the third party touches the external device B, which is not registered in the connection permission list, to the electronic apparatus 10, it is possible to prevent such a situation from occurring that the unique ID of the external device B is unlawfully registered in the connection permission list.

As has been described above, in the present embodiment, the content itself of the connection permission list, which is stored in the electronic apparatus 10, can be protected by using the password verification. Thus, the risk of data theft can be reduced without executing special communication for ensuring security, such as exchanging passwords or key codes between the close proximity wireless transfer 20 and external device A. In addition, when the user wishes to execute communication between a device, which is not registered in the connection permission list, and the electronic apparatus 10, it should suffice if the user simply performs the operation of touching the device to the electronic apparatus 10 and entering the password. Therefore, the connection between the device, which is not registered in the connection permission list, and the electronic apparatus 10 can easily be permitted by only the entry of the password by the user.

The storage device 13 is composed of, e.g. a hard disk drive or a nonvolatile semiconductor memory. The input module 14 is an input device for inputting data and an instruction, which are to be delivered to the CPU 111. The input module 14 is realized, for example, by a keyboard, a plurality of button switches, or a pointing device.

The LCD 15 is a display device which is used as a display of the electronic apparatus 10. The sound controller 16 is a sound source circuit for producing sound corresponding to audio data which is sent from the CPU 101a. The sound controller 16 converts the audio data, which is sent from the CPU 101a, from a digital audio signal to an analog audio signal, and outputs the analog audio signal to the speaker 17. The speaker 17 produces sound corresponding to the analog audio signal.

The indicator 18 presents the state (e.g. the start of data transfer, the end of data transfer, etc.) of close proximity wireless transfer which is executed by the close proximity wireless transfer device 20. The indicator 18 includes a light emission module such as an LED.

The power supply control module 19 supplies power to the respective components in the electronic apparatus 10 by using power which is supplied from the outside via an AC adapter 30 or power which is supplied from a battery 19b provided in the electronic apparatus 10. In other words, the electronic apparatus 10 is driven by an external power supply such as an AC commercial power supply, or by the battery 19b. The AC adapter 30 may be provided within the electronic apparatus 10. The power supply control module 19 powers on/off the electronic apparatus 10 in accordance with an operation of a power switch (P-SW) 19a by the user.

The close proximity wireless transfer device 20 is a communication module which executes close proximity wireless transfer. The close proximity wireless transfer device 20 can communicate with some other device (external device) having a close proximity wireless transfer function, which is present within a predetermined range from the close proximity wireless transfer device 20. The wireless communication between the close proximity wireless transfer device 20 and the external device is enabled only when the close proximity wireless transfer device 20 and the external device are in close proximity, that is, only when the distance between the close proximity wireless transfer device 20 and the external device is decreased to the range of communication (e.g. 3 cm) or less. When the close proximity wireless transfer device 20 and the external device are brought close to each other within the range of communication, the communication between the close proximity wireless transfer device 20 and the external device is enabled. Then, the operation of establishing a connection (wireless connection) between the close proximity wireless transfer device 20 and the external device, or in other words, the operation of establishing a communication path for communication between an application in the electronic apparatus 10 and an application in the external device, is started. After the connection (wireless connection) between the devices is established, transfer of data, such as a data file which is explicitly designated by the user, or a predetermined data file which is to be synchronized, is executed between the close proximity wireless transfer device 20 and the external device.

In the close proximity wireless transfer, an induction electric field is used. As a close proximity wireless transfer method, TransferJet™, for instance, can be used. TransferJet™ is a close proximity wireless transfer method which uses UWB, and high-speed data transfer can be realized.

The close proximity wireless transfer device 20 is connected to an antenna 20b. The antenna 20b is an electrode called "coupler", and executes data transmission and reception to and from the external device by a radio signal using an induction electric field. When the external device comes near within the range of communication (e.g. 3 cm) from the antenna 20b, the antennas (couplers) of the close proximity wireless transfer device 20 and the external device are coupled by the induction electric field, and thereby wireless communication between the close proximity wireless transfer device 20 and the external device is enabled. In the meantime, the close proximity wireless transfer device 20 and the antenna 20b can be realized as a single module.

Figure 2:
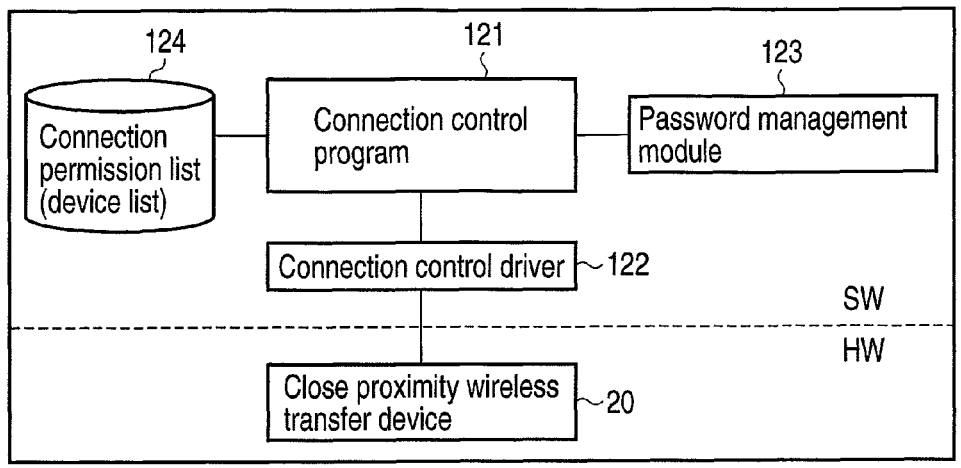
FIG. 2 is an exemplary block diagram showing the structure of a communication control program which is used in the electronic apparatus of the embodiment.

Next, referring to FIG. 2, the structure of the communication control program 12a is described.

The communication control program 12a includes a connection control program 121, a connection control driver 122 and a password management module 123. The connection control driver 122 is a program functioning as a protocol stack for controlling the operation of the close proximity wireless transfer device 20. The connection control program 121 is a program for controlling the operation for establishing the connection between the close proximity wireless transfer device 20 and the external device. The connection control program 121 executes a function for managing a connection permission list 124, a function for managing a password in cooperation with the password management module 123, and a function for permitting or prohibiting registration of a device in the connection permission list 124 with use of the password verification.

The connection permission list 124 is information indicative of unique IDs of devices which are permitted to establish a connection to the close proximity wireless transfer device 20. The connection permission list 124 is stored, for example, in the storage device 13 provided in the electronic apparatus 10. The password management module 123 is a program for managing passwords. The password management module 123 can manage, for example, a password (registered password), which is used for the above-described password verification, in association with each of log-in users. For example, the password is encrypted, and the encrypted password is stored in a registry area, for example. In the present embodiment, character codes, which are usable as passwords, are limited to numerals (0-9), and character codes, such as alphabets, cannot be used as passwords. This aims at enabling the user to undergo password verification by simply typing and entering some numerals alone, without typing and entering character codes such as alphabets.

Figure 3:
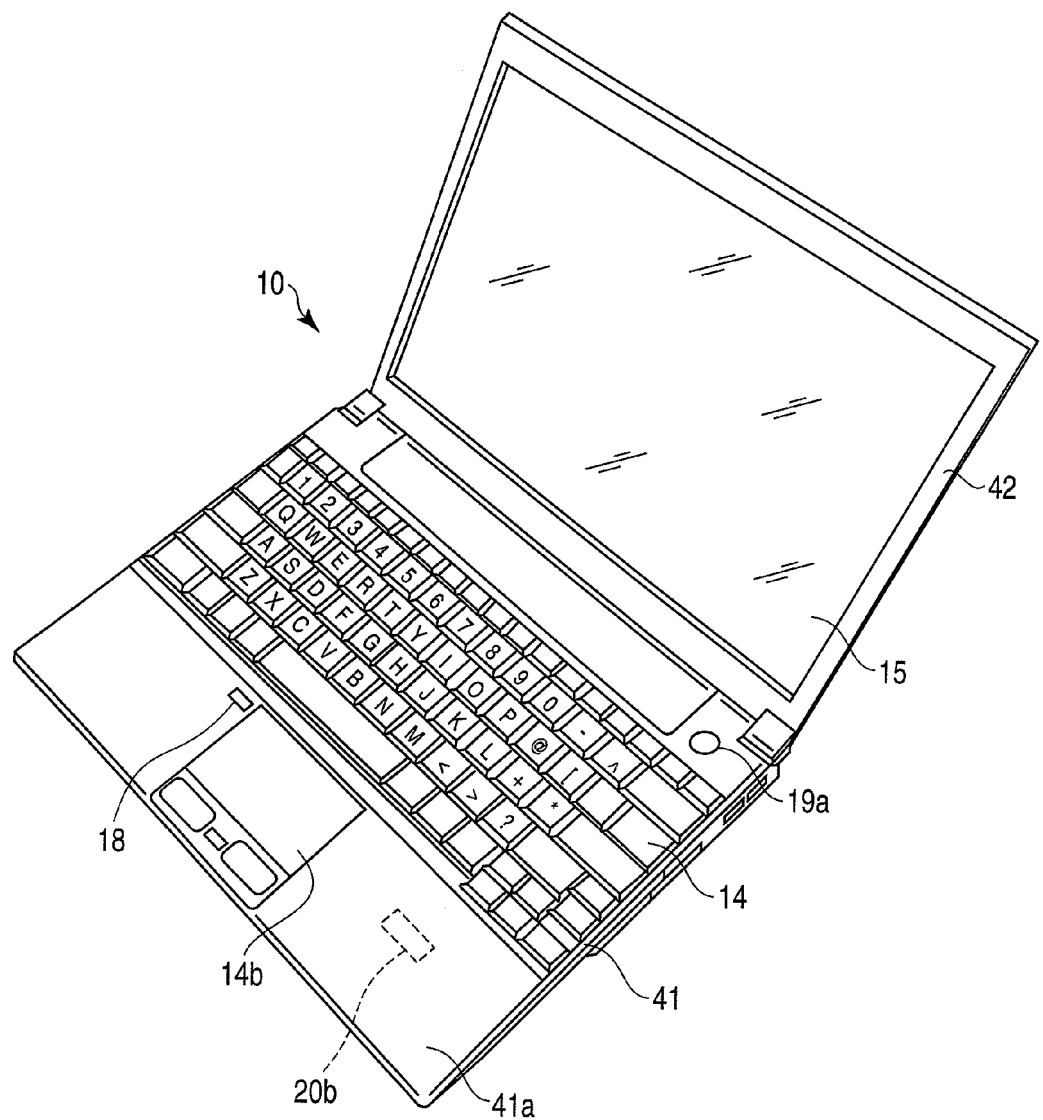
FIG. 3 is an exemplary perspective view showing the external appearance of the electronic apparatus of the embodiment.

Next, referring to FIG. 3, an example of the external appearance of the electronic apparatus 10 is described, assuming that the electronic apparatus 10 is realized as a portable personal computer.

FIG. 3 is a perspective view showing the external appearance of the electronic apparatus 10.

The electronic apparatus 10 comprises a main body 41 and a display unit 42. The display unit 42 is attached to the main body 41 such that the display unit 42 is rotatable between an open position where the top surface of the main body 41 is exposed, and a closed position where the top surface of the main body 41 is covered by the display unit 42. The above-described LCD 15 is provided in the display unit 42.

The main body 41 has a thin box-shaped housing. A keyboard 14a, a touch pad 14b, indicator 18 and power switch 19a are disposed on the top surface of the housing of the main body 41.

The top surface of the main body 41, to be more specific, a part of a palm rest area 41a on the top surface of the main body 41, functions as a communication surface. Specifically, the close proximity wireless transfer device 20 and antenna (coupler) 20b are provided within the main body 41 so as to be opposed to the palm rest area 41a on the top surface of the main body 41. The antenna (coupler) 20b is disposed so as to output a radio signal (induction electric field) to the outside via the top surface of the main body 41 (specifically, a part of the palm rest area 41a on the top surface of the main body 41). A small area on the top surface of the main body 41, which is opposed to the antenna (coupler) 20b, that is, a small area on the top surface of the main body 41, which is located on the upper side of the antenna (coupler) 20b, is used as a communication position.

The user can start data transfer between the external device and the electronic apparatus 10 by performing, for example, an operation (also referred to as "touch operation") of holding the external device, which has the close proximity wireless transfer function, over the communication position in the palm rest area 41a on the top surface of the main body 41. In the state in which the electronic apparatus 10 and the external device are brought in close proximity, it is possible that a part of the keyboard 14 of the electronic apparatus 10, for example, some keys in the keyboard which are located on the palm rest area 41a side, may be covered with the external device such as a mobile phone, and the operation of such keys may become difficult.

In an ordinary computer, alphabet keys are dispersedly arranged at plural key positions on the keyboard, but all numeral keys are concentrated on an upper part of the keyboard. In the embodiment, as described above, the character codes, which are usable as passwords, are limited to the numerals (0-9). Thus, the user can enter, with no problem, the password, which is composed of only a combination of numeral keys, even in the state in which the external device is placed on the palm rest area 41a, or even in the state in which the external device is held over the palm rest area 41a of the main body 41.

Figure 4:
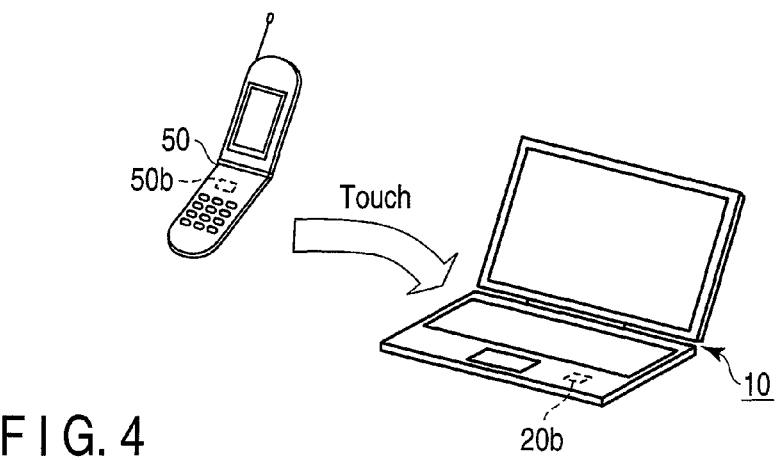
FIG. 4 illustrates an example of close proximity wireless transfer which is executed between the electronic apparatus of the embodiment and an external device.

FIG. 4 illustrates close proximity wireless transfer which is executed between a mobile phone 50 and the electronic apparatus 10. An antenna (coupler) 50b for close proximity wireless transfer is provided within the housing of the mobile phone 50 so as to be opposed to the back surface of the housing. In this case, close proximity wireless transfer between the mobile phone 50 and electronic apparatus 10 can be started by bringing the back surface of the housing of the mobile phone 50 over the communication position on the palm rest area of the main body 41 of the electronic apparatus 20.

Figure 5:
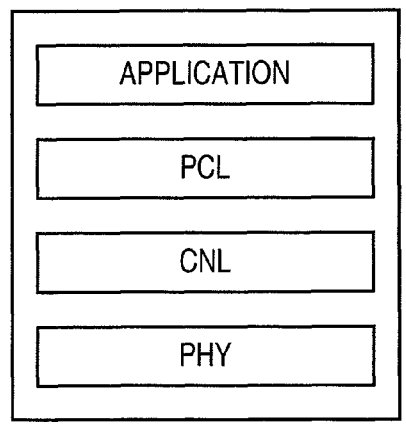
FIG. 5 shows an example of a software architecture for controlling close proximity wireless transfer, which is applied to the electronic apparatus of the embodiment.

Next, referring to FIG. 5, a description is given of a software architecture for controlling close proximity wireless transfer which is executed with use of the close proximity wireless transfer device 20.

The software architecture of FIG. 5 shows a hierarchical structure of a protocol stack for controlling close proximity wireless transfer. The protocol stack comprises a physical layer (PHY), a connection layer (CNL), a protocol conversion layer (PCL), and an application layer.

The physical layer (PHY) is a layer which controls physical data transfer, and corresponds to a physical layer in an OSI reference model. A part or all of the functions of the physical layer (PHY) may also be realized by using hardware in the close proximity wireless transfer device 20.

The physical layer (PHY) converts data from the connection layer (CNL) to a radio signal. The connection layer (CNL) corresponds to a data link layer and a transport layer in the OSI reference model, and executes data communication by controlling the physical layer (PHY).

Responding to a connection request from the protocol conversion layer (PCL) or a connection request from the external device, the connection layer (CNL) executes a process of establishing a physical link (CNL connection) between the close proximity wireless transfer device 20 and the external device, which are set in a close proximity state. A description is now given of the procedure for establishing a CNL connection between two devices (device 1 and device 2). Of the devices 1 and 2, the device which is to start communication, for example, the device 1, executes a process for wirelessly transmitting a connection request (C-Req). The connection request (C-Req) may include a unique ID of the device 1. The device 2 periodically executes a process for receiving the connection request (C-Req). When the device 1 and device 2 are in a close proximity state, the device 2 can receive the connection request (C-Req) which is transmitted from the device 1. When the device 2 has received the connection request (C-Req), the device 2 wirelessly transmits to the device 1 a response (C-Acc) which is indicative of the acceptance of the received connection request (C-Req). This response (C-Acc) may include a unique ID of the device 2. The device 1 can receive the response (C-Acc) which is wirelessly transmitted from the device 2. In this manner, the link (CNL connection) between the device 1 and device 2 is established by transmitting/receiving the connection request signal (C-Req) and connection response signal (C-Acc) between the device 1 and device 2.

The protocol conversion layer (PCL) corresponds to a session layer and a presentation layer in the OSI reference model, and is positioned between the application layer and the connection layer (CNL) for controlling establishment and release of the link between the two devices. In order to establish the connection between the two devices, the protocol conversion layer (PCL) executes control of each application (communication program) in the application layer, and executes control of the connection layer (CNL).

To be more specific, the protocol conversion layer (PCL) executes a conversion process for converting data (user data), which corresponds to application protocols (e.g. SCSI, OBEX, and other general-purpose protocols) that are handled by the communication programs in the application layer, to a specific transmission data format. By this conversion process, data, which is transmitted/received by any one of the communication programs, is converted to packets (data of a specific transmission data format) which can be handled by the connection layer (CNL). The protocol conversion layer (PCL) enables the use of various application protocols in the close proximity wireless transfer.

In the present embodiment, the protocol conversion layer (PCL) has three modes (proactive mode, reactive mode and flexible mode), and is operable in one of these three modes.

The proactive mode is a mode for a device to function as a so-called master. A device in the proactive mode can control a communication-counterpart device (peer device) and can execute a service such as data transfer between devices. The reactive mode is a mode for a device to function as a so-called slave. A device in the reactive mode can execute a service, such as data transfer between devices, under the control of the peer device.

The default mode of a mobile device, such as a mobile phone, which cannot be driven by an external power supply, is determined to be the reactive mode in order to reduce power consumption. When an application of the mobile device is operated by a user, the mobile device automatically transitions from the reactive mode to the proactive mode.

The device, which is set in the proactive mode, sends a connection request signal C_Req. On the other hand, the device, which is set in the reactive mode, does not send a connection request signal C_Req and accordingly the power consumption of the device in the reactive mode is relatively small.

The flexible mode is a mode in which a device can automatically transition the own mode to the proactive mode or to the reactive mode in accordance with the mode of the peer device (proactive mode or reactive mode). The device in the flexible mode transitions to the reactive mode if the mode of the peer device is the proactive mode, and the device in the flexible mode transitions to the proactive mode if the mode of the peer device is the reactive mode. The transition to the proactive mode or to the reactive mode is executed, for example, after the CNL connection between the devices is established.

The default mode of a device, such as a personal computer, which can be driven by an external power supply such as an AC adapter power supply, is the flexible mode. The device in the flexible mode can send a connection request signal C_Req. Thereby, for example, even in the case where the user brings the mobile phone close to the personal computer (the device in the flexible mode) without operating an application of the mobile phone, the CNL connection between the devices can be established.

Figure 6:
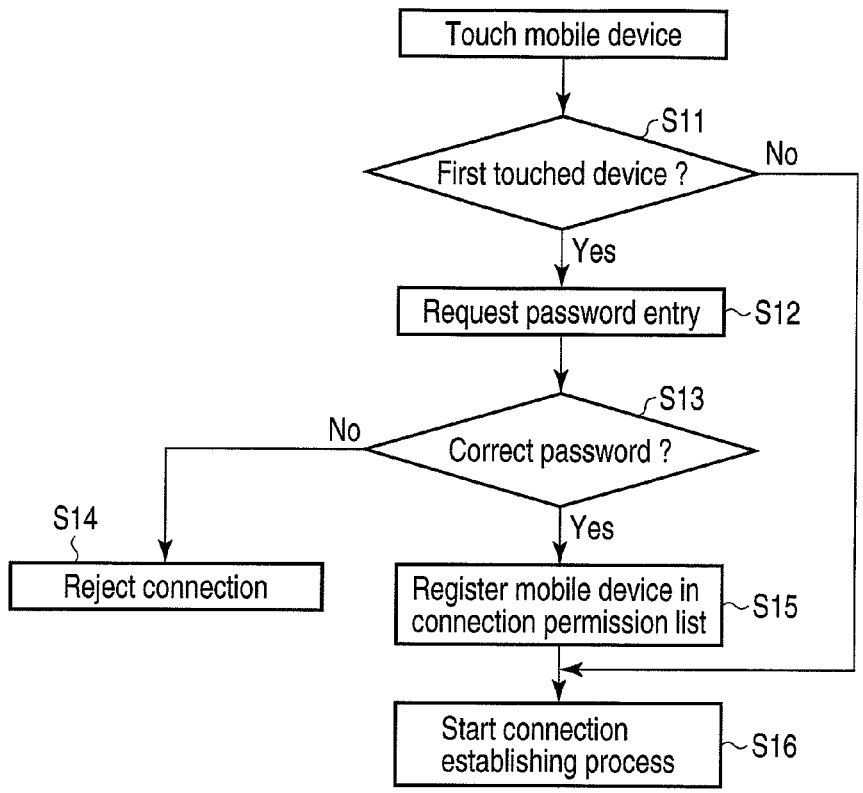
FIG. 6 is an exemplary flow chart illustrating a procedure of a connection control operation which is executed by the electronic apparatus of the embodiment.

Next, referring to a flow chart of FIG. 6, a description is given of the procedure of a connection control process which is executed by the electronic apparatus 10.

The case is assumed in which a mobile device, such as a mobile phone or a digital camera, has been touched to the palm rest area of the electronic apparatus 10. When the mobile device is touched to the palm rest area of the electronic apparatus 10, communication is started between the close proximity wireless transfer device 20 of the electronic apparatus 10 and the mobile device. The communication control program 12a first determines whether the mobile device is a device which has first been touched to the electronic apparatus 10 (step S11). In step S11, the communication control program 12a receives, via the close proximity wireless transfer device 20, the unique ID included in a signal (connection request signal C_Req or response signal C_Acc) which is wirelessly transmitted from the mobile device, and determines whether the received unique ID is included in the connection permission list 124 or not. If the received unique ID is not included in the connection permission list 124, that is, if the received unique ID is not registered in the connection permission list 124, the communication control program 12a determines that the mobile device is a device which has first been touched to the electronic apparatus 10. On the other hand, if the received unique ID is included in the connection permission list 124, the communication control program 12a recognizes that the mobile device is a device which is permitted to establish a connection to the electronic apparatus 10.

If it is determined in step S11 that the mobile device is a device which is already permitted to establish a connection to the electronic apparatus 10 (NO in step S11), the communication control program 12a advances to step S16 and starts the operation for establishing a connection between the mobile device and the close proximity wireless transfer device 20 (step S16). In step S16, the communication control program 12a executes a negotiation process for determining, for example, the type of data which is transferred between the mobile device and the electronic apparatus 10 and the protocol to be used (e.g. SCSI, OBEX, other general-purpose protocol), and establishes a communication path (connection) for communication between the application layer of the electronic apparatus 10 side and the application layer of the mobile device side.

On the other hand, if it is determined in step S11 that the mobile device is a device which has first been touched to the electronic apparatus 10 (YES in step S11), the communication control program 12a causes the LCD 15 to display the password entry screen for prompting the user to enter the password (step S12). Then, the communication control program 12a compares the password which has been entered on the password entry screen and the registered password. If the entered password is valid, that is, if the entered password is a correct password matching with the registered password (YES in step S13), the communication control program 12a adds the unique ID of the mobile device to the connection permission list 124 in order to register the mobile device as the device which can establish the connection to the electronic apparatus 10 (step S15). The communication control program 12a advances to step S16 and starts the operation for establishing the connection between the mobile device and the close proximity wireless transfer device 20 (step S16). Although step S16 has been executed after the process of step S15, step S15 may be executed after step S16.

If the entered password is invalid, that is, if the password matching with the registered password is not entered (YES in step S13), the communication control program 12a rejects the connection between the mobile device and the close proximity wireless transfer 20 (step S14). In this case, the unique ID of the mobile device is not added to the connection permission list 124.

Figure 7:
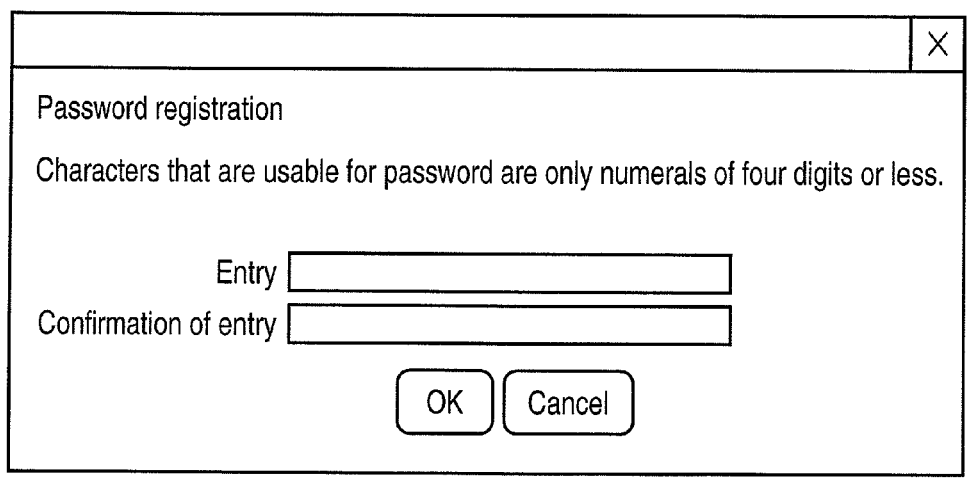
FIG. 7 shows a password registration screen which is displayed on a display of the electronic apparatus of the embodiment.

FIG. 7 shows an example of a password registration screen which is used for the registration of the password. Responding to the occurrence of a password registration request event from the user, the communication control program 12a causes the LCD 15 to display the password registration screen shown in FIG. 7. As described above, the characters that are usable for the password are limited to numerals of, e.g. four digits or less.

Figure 8:
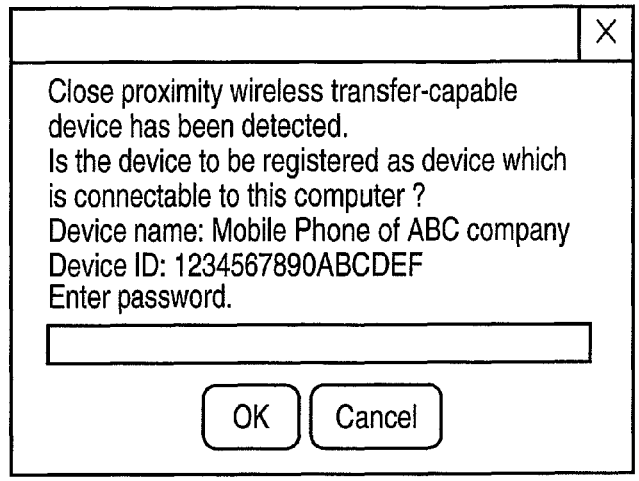
FIG. 8 shows an exemplary password entry screen which is displayed on the display of the electronic apparatus of the embodiment.

FIG. 8 shows an example of the password entry screen for password verification. The password entry screen is described, assuming the case in which the electronic apparatus 10 is realized by a computer.

The password entry screen, as shown in FIG. 8, displays a message for prompting the user to confirm whether the detected device (the device touched to the electronic apparatus 10) is to be registered as the device which is connectable to the electronic apparatus 10, and also displays the device name and device ID of the detected device. The device name and device ID are displayed based on the unique ID which has been received from the detected device. The password entry screen further displays a password entry field.

If the "OK" button is clicked in the state in which the correct password is entered in the password entry field, the unique ID of the detected device is added to the connection permission list 124, and thereby this device is registered as the device which is connectable to the electronic apparatus 10. If the correct password is not entered or if the "Cancel" button is clicked, the unique ID of the detected device is not added to the connection permission list 124.

Figure 9:
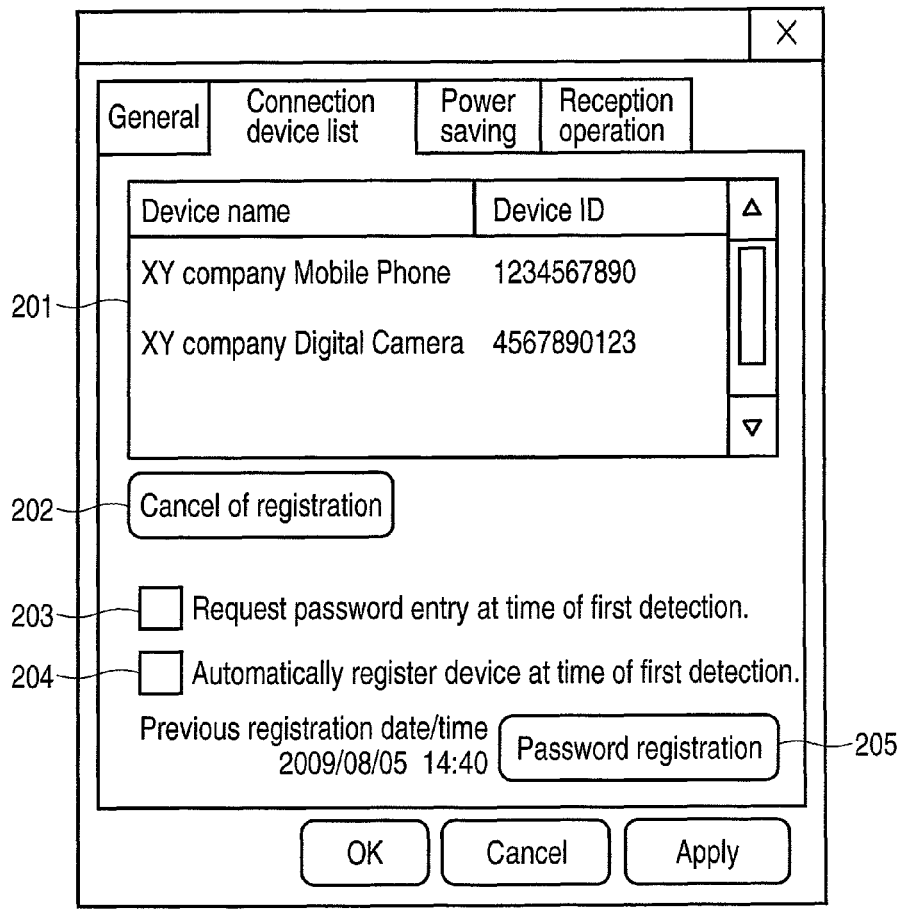
FIG. 9 shows an example of a setup screen for close proximity wireless transfer, which is displayed on the display of the electronic apparatus of the embodiment.

Next, referring to FIG. 9, a description is given of an example of a setup screen for setting up the operational environment of the close proximity wireless transfer. This setup screen is displayed on the LCD 15 by the communication control program 12a.

A "Connection device list" tab on the setup screen is used in order to manage the list of devices which are connectable to the electronic apparatus 10. The "Connection device list" displays a device list window 201, a registration cancel button 202, mode select check boxes 203 and 204, and a password registration button 205.

The device list window 201 displays the list of the devices which are connectable to the electronic apparatus 10, based on unique IDs in the connection permission list 124. If the registration cancel button 202 is clicked in the state in which a certain device in the device list window 201 is selected, the unique ID corresponding to the selected device is deleted from the connection permission list 124.

The mode select check boxes 203 and 204 are used in order to determine the operation mode for controlling the close proximity wireless transfer, that is, the operation mode of the connection control operation which is executed by the communication control program 12a. In the present embodiment, two modes, in general classification, are used for the connection control. A first mode is an operation mode in which password entry is requested when a non-registered device (a device first touched to the electronic apparatus 10) has been detected. A second mode is an operation mode in which password entry is not requested when a non-registered device (a device first touched to the electronic apparatus 10) has been detected.

If the mode select check box 203 is checked, the operation mode of the connection control operation is set in the first mode (authentication & password entry mode). During the period in which the operation mode is the first mode, the communication control program 12a displays the password entry screen of FIG. 8 when a non-registered device (a device first touched to the electronic apparatus 10) has been detected.

If the mode select check box 204 is checked, the operation mode of the connection control operation is set in an auto-registration mode. The auto-registration mode is a kind of the above-described second mode. During the period in which the operation mode is the auto-registration mode, the communication control program 12a does not display any kind of screen, such as the password entry screen, when a non-registered device (a device first touched to the electronic apparatus 10) has been detected, and automatically adds the unique ID of the non-registered device to the connection permission list 124.

If neither the mode select check box 203 nor 204 is checked, the operation mode of the connection control operation is set in an authentication mode. The authentication mode is also a kind of the second mode. During the period in which the operation mode is the authentication mode, the communication control program 12a does not display the password entry screen when a non-registered device (a device first touched to the electronic apparatus 10) has been detected, and displays only a confirmation screen for prompting the user to confirm whether the detected device is to be added to the connection permission list 124. Only when the addition to the connection permission list 124 is permitted by the user, the communication control program 12a adds the unique ID of the detected device to the connection permission list 124. Both the mode select check boxes 203 and 204 cannot be checked at the same time.

In the present embodiment, as described above, using the setup screen of FIG. 9, the user can select, as needed, the first mode (authentication & password entry mode) or the second mode (authentication mode or auto-registration mode). Thus, for example, the user can perform such an operation that the user first uses the second mode to register some mobile devices owned by the user (e.g. a mobile phone, a digital camera, an audio player, etc.) as devices which are connectable to the electronic apparatus 10, and then switches the operation mode to the first mode to enhance the level of security. Even after the switching is effected to the first mode, as regards the device having the unique ID registered in the connection permission list 124, the user can easily perform data exchange between this device and the electronic apparatus 10, simply by touching the device to the electronic apparatus 10. Specifically, during the period of the first mode, when the device having the unique ID already registered in the connection permission list 124 has been touched to the electronic apparatus 10, neither the password entry screen nor the confirmation screen is displayed, and the operation for establishing the connection between this device and the electronic apparatus 10 is immediately started. The entry of the password is requested only when a device having a unique ID not registered in the connection permission list 124 has been touched to the electronic apparatus 10. Since the entry of the password is not requested unless a new device is touched to the electronic apparatus 10, the user may forget the registered password.

In the present embodiment, in order to easily cope with the case in which the user forgets the registered password, a password re-registration function (also referred to as "registered password change function") is provided for changing the registered password to a new password, without requesting the entry of the password agreeing with the registered password. The password registration button 205 is a button for generating a password registration request event. If the password registration button 205 is clicked, the password registration screen for password registration or password re-registration is displayed. The password registration button 205 can be used for first-time password registration and the above-described password re-registration.

However, the use of the password re-registration function incurs such a risk that a malicious third party rewrites the registered password to another password. To cope with this problem, the communication control program 102a is provided with a password registration date and time display function which displays on the LCD 15 the previous password date and time, that is, the date and time at which the password was last registered. For example, as shown in FIG. 9, the previous password registration date and time is displayed on the "Connection device list" tab screen. By viewing the previous password registration date and time, the user can recognize whether the registered password has unlawfully been changed by a third party.

Figure 10:
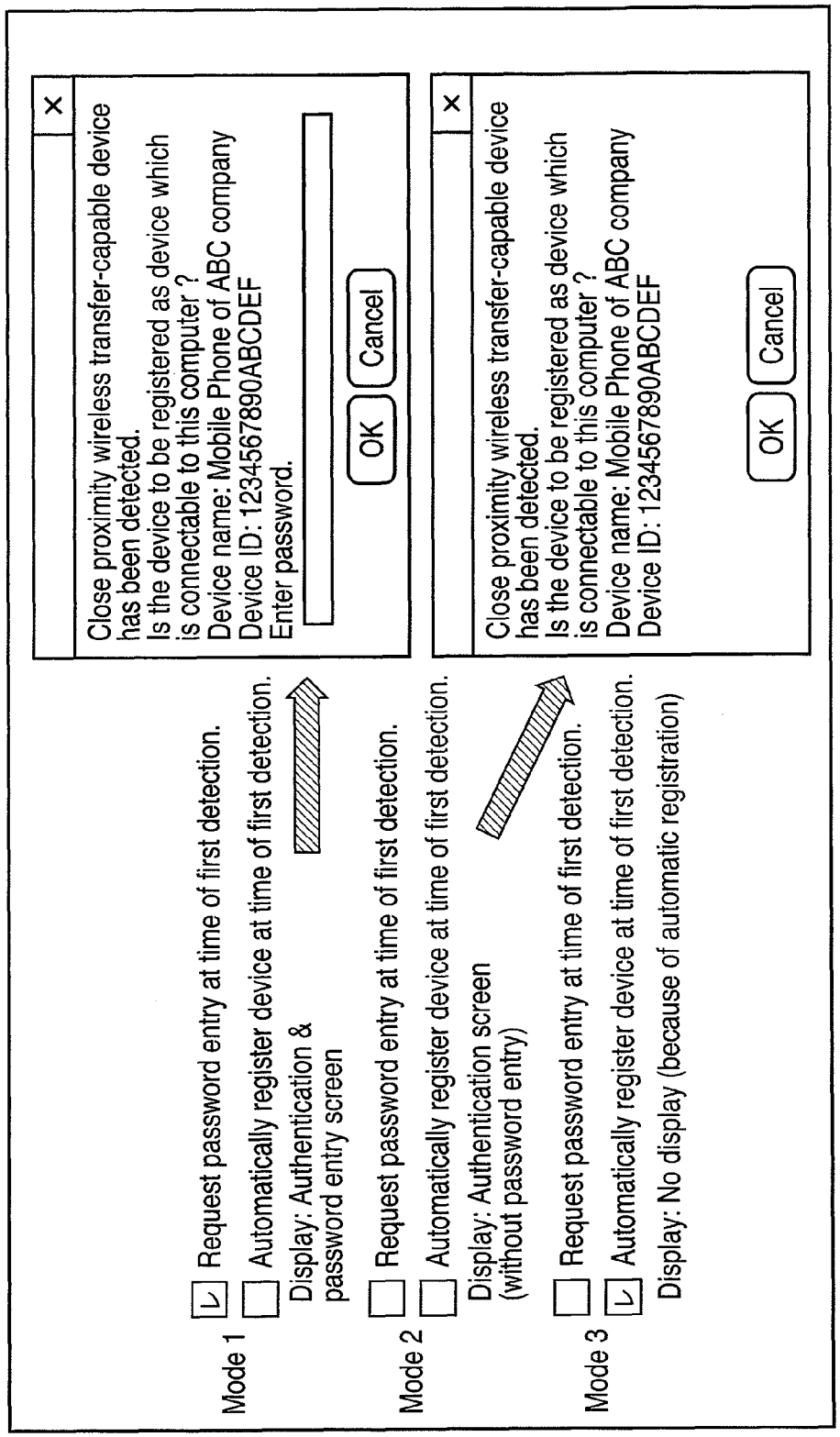
FIG. 10 is an exemplary view for explaining device registration modes which are applied to the electronic apparatus of the embodiment.

Next, referring to FIG. 10, a description is given of the relationship between the password entry screen, which is displayed in the authentication & password entry mode (mode 1), and the confirmation screen (also referred to as "authentication screen"), which is displayed in the authentication mode (mode 2).

The password entry screen, as described above, displays the device name and device ID of the device which has first been touched to the electronic apparatus 10, the message for prompting the user to confirm whether this device is to be registered as the device which is connectable to the electronic apparatus 10, and the password entry field. If the "OK" button on the password entry screen is clicked in the state in which the correct password is entered on the password entry screen, the unique ID of this device is added to the connection permission list 124.

The confirmation screen displays the device name and device ID of the device which has first been touched to the electronic apparatus 10, and the message for prompting the user to confirm whether this device is to be registered as the device which is connectable to the electronic apparatus 10, and does not display the password entry field. If the "OK" button on the confirmation screen is clicked, the unique ID of this device is added to the connection permission list 124.

In the auto-registration mode (mode 3), even if a device, which has first been touched to the electronic apparatus 10, is detected, neither the password entry screen nor the confirmation screen is displayed.

Figure 11:
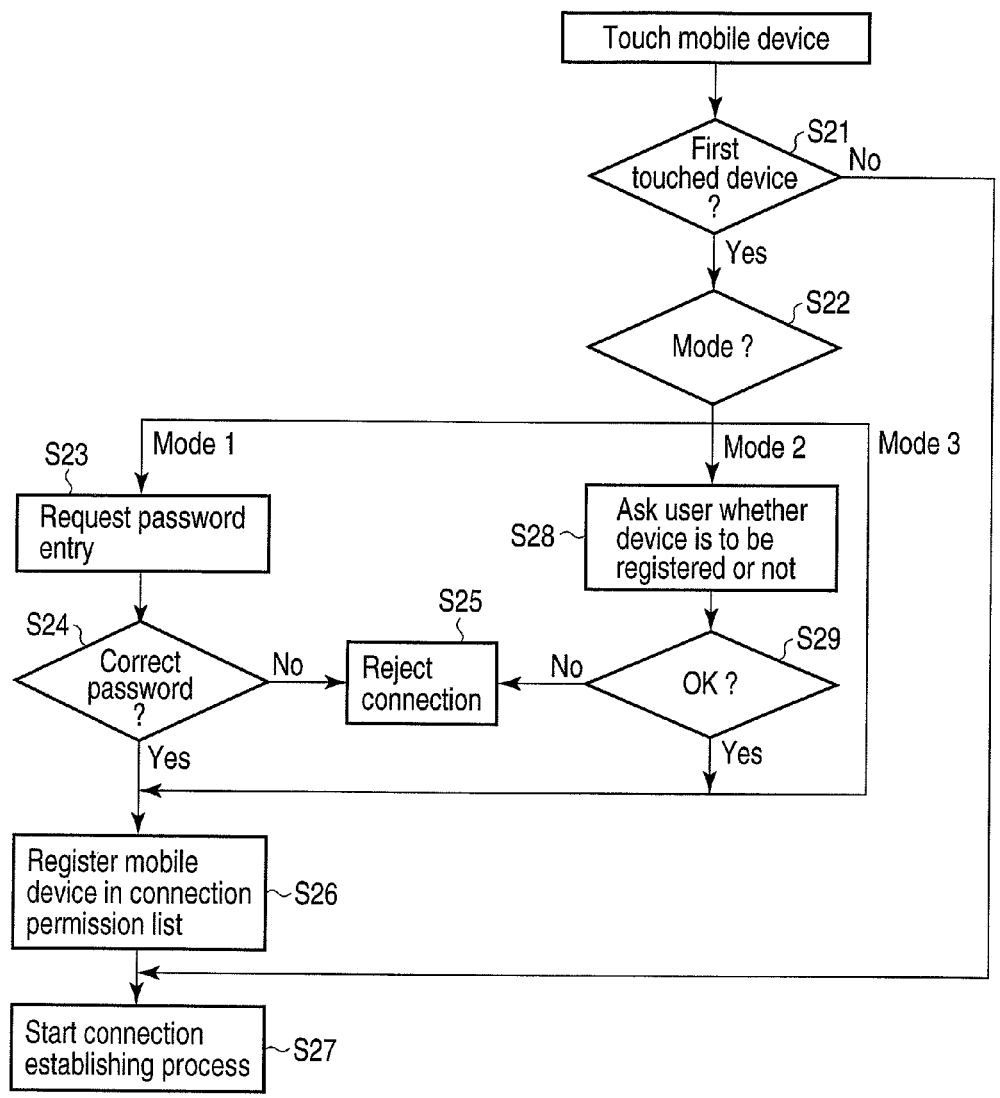
FIG. 11 is an exemplary flow chart illustrating another procedure of the connection control operation which is executed by the electronic apparatus of the embodiment.

Next, referring to a flow chart of FIG. 11, a description is given of the procedure of the connection control process corresponding to the authentication & password entry mode (mode 1), the authentication mode (mode 2) and the auto-registration mode (mode 3).

When the mobile device is touched to the palm rest area of the electronic apparatus 10, communication is started between the close proximity wireless transfer device 20 of the electronic apparatus 10 and the mobile device. To begin with, the communication control program 12a determines whether the mobile device is a device which has first been touched to the electronic apparatus 10 (step S21). In step S21, the communication control program 12a receives, via the close proximity wireless transfer device 20, the unique ID included in a signal (connection request signal C_Req or response signal C_Acc) which is wirelessly transmitted from the mobile device, and determines whether the received unique ID is included in the connection permission list 124 or not. If the received unique ID is not included in the connection permission list 124, that is, if the received unique ID is not registered in the connection permission list 124, the communication control program 12a recognizes that the mobile device is a device which has first been touched to the electronic apparatus 10. On the other hand, if the received unique ID is included in the connection permission list 124, the communication control program 12a recognizes that the mobile device is a device which is permitted to establish a connection to the electronic apparatus 10.

If it is determined in step S21 that the mobile device touched to the electronic apparatus 10 is a device which is already permitted to establish a connection to the electronic apparatus 10 (NO in step S21), the communication control program 12a advances to step S27 and starts the operation for establishing a connection between the mobile device and the close proximity wireless transfer device 20.

On the other hand, if it is determined in step S21 that the mobile device is a device which has first been touched to the electronic apparatus 10 (YES in step S21), the communication control program 12a determines whether the present operation mode is the authentication & password entry mode (mode 1), the authentication mode (mode 2) and the auto-registration mode (mode 3) (step S22).

If the present operation mode is the authentication & password entry mode (mode 1), the communication control program 12a executes the same process as the process of steps S12 to S16 of the flow chart of FIG. 6 (steps S23 to S27).

If the present operation mode is the authentication mode (mode 2), the communication control program 12 causes the LCD 15 to display the confirmation screen for confirming whether the mobile device, which has first been touched, is to be registered as the device which is connectable to the electronic apparatus 10, thereby asking the user whether this mobile device is to be registered as the device which is connectable to the electronic apparatus 10 (step S28). If the "OK" button on the confirmation screen is clicked (YES in step S29), the communication control program 12a adds the unique ID of the mobile device to the connection permission list 124 in order to register the mobile device as the device which can establish the connection to the electronic apparatus 10 (step S26). The communication control program 12a advances to step S27 and starts the operation for establishing the connection between the mobile device and the close proximity wireless transfer device 20. If the "Cancel" button on the confirmation screen is clicked (NO in step S29), the communication control program 12a rejects the connection between the mobile device and the close proximity wireless transfer 20 (step S25). In this case, the unique ID of the mobile device is not added to the connection permission list 124.

If the present operation mode is the auto-registration mode (mode 3), the communication control program 12a adds the unique ID of the mobile device to the connection permission list 124 in order to register the mobile device as the device which can establish the connection to the electronic apparatus 10 (step S26). The communication control program 12a advances to step S27 and starts the operation for establishing the connection between the mobile device and the close proximity wireless transfer device 20.

Figure 12:
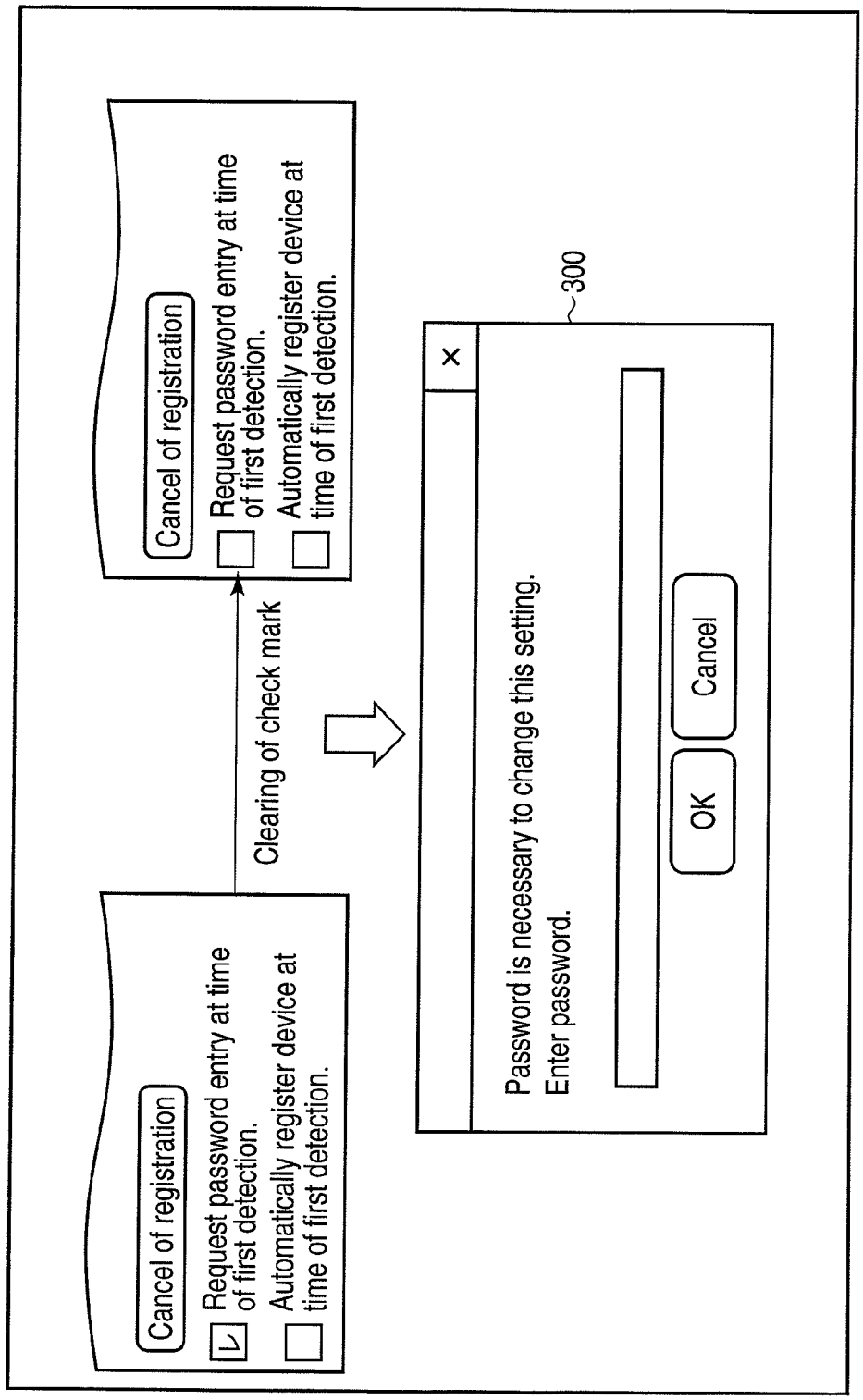
FIG. 12 is an exemplary view for explaining the operation which is executed by the electronic apparatus of the embodiment when the device registration mode is changed.

Next, referring to FIG. 12, a description is given of a process which is executed by the communication control program 12a when the check mark in the mode select check box 203 is cleared.

If the clearing of the check mark in the mode select check box 203 is unconditionally permitted, it is possible that a malicious third party unlawfully changes the present operation mode from the authentication & password entry mode to the authentication mode or the auto-registration mode. Thus, when the check mark in the mode select check box 203 is cleared, that is, when a mode change request event has occurred for a change from the authentication & password entry mode to the authentication mode or the auto-registration mode, the communication control program 12a causes the LCD 15 to display a password entry screen 300, as shown in FIG. 12. Only when the correct password matching with the registered password is entered on the password entry screen 300, the communication control program 12a permits a change of the mode, and changes the present mode from the authentication & password entry mode to the authentication mode or the auto-registration mode.

Next, a password re-registration function is described.

Figure 13:
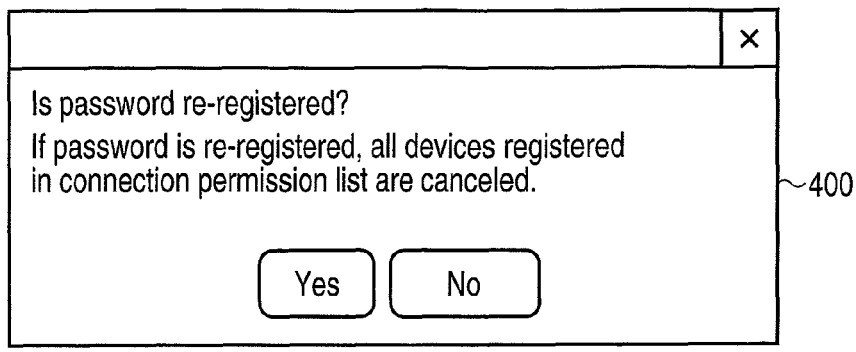
FIG. 13 shows an exemplary password re-registration confirmation screen which is displayed on the display of the electronic apparatus of the embodiment.

When the password registration button 205 shown in FIG. 9 is clicked in the state in which the password is already registered, the communication control program 12a displays a confirmation screen 400, as shown in FIG. 13. The confirmation screen 400 displays a message to the effect that if the password is re-registered, the registration of all devices is canceled.

If the "Yes" button on the confirmation screen 400 is clicked, the password registration screen of FIG. 7 is displayed. If the "OK" button is clicked on the password registration screen on which a password has been entered, this password is registered as a new registered password in the electronic apparatus 10, and all the IDs included in the connection permission list 124 are deleted. In the present embodiment, as described above, the change of the registered password is permitted without executing password verification which requires the entry of the password matching with the registered password. However, when the registered password is changed, the contents of the connection permission list 124 are cleared. By once clearing the contents of the connection permission list 124 in this manner, the connection control process based on the changed, new registered password can be re-started from the default state (i.e. the state in which no ID is registered in the connection permission list 124). If the No button on the confirmation 400 is clicked, the screen returns to the "Connection device list" tab screen of FIG. 9.

Figure 14:
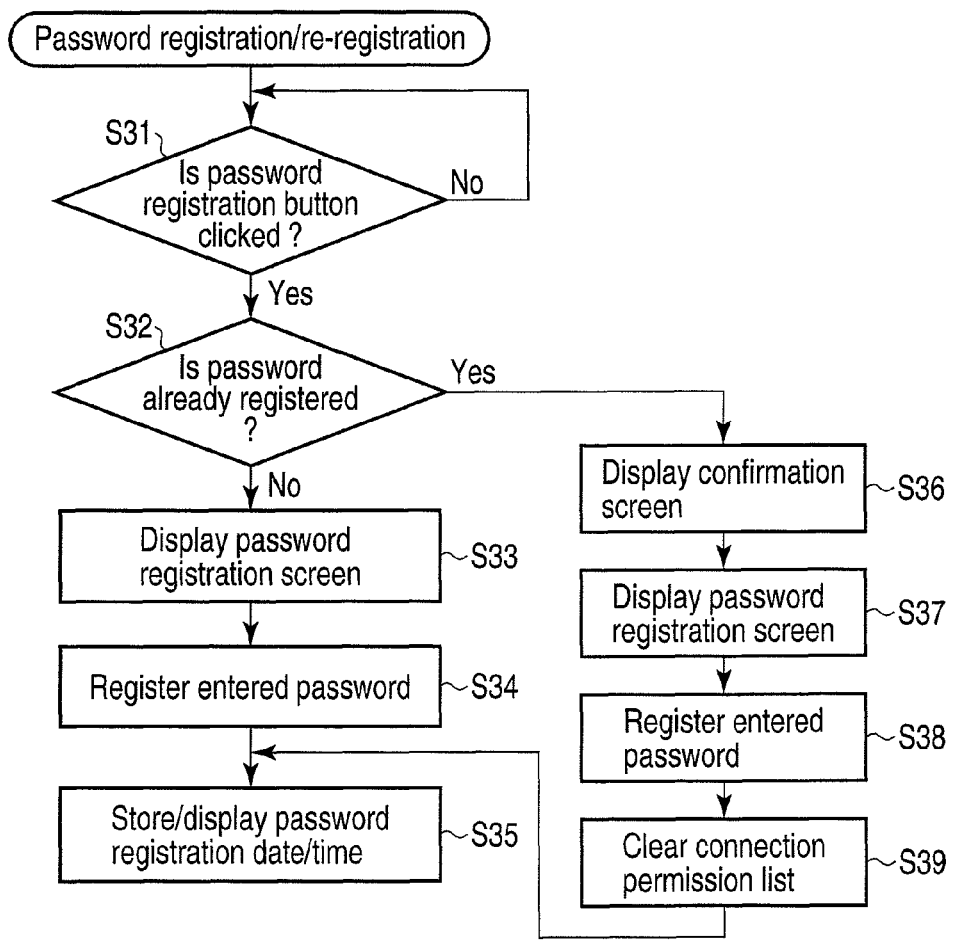
FIG. 14 is an exemplary flow chart illustrating the procedure of the password re-registration process which is executed by the electronic apparatus of the embodiment.

Next, referring to a flow chart of FIG. 14, the procedure of the password registration/re-registration process is described.

When the password registration button 205 on the "Connection device list" tab screen of FIG. 9 is clicked (YES in step S31), the communication control program 12a determines whether the registered password is already present, that is, whether the password is already registered (step S32).

If no registered password is stored (NO in step S32), the communication control program 12a causes the LCD 15 to display the password registration screen of FIG. 7 (step S33). The communication control program 12a stores a password, which has been entered on the password registration screen, in the registry as a registered password (step S34). Further, the communication control program 12a stores the present date and time as the date and time of storage of the registered password, that is, the password registration date and time, and displays the password registration date and time on the "Connection device list" tab screen of FIG. 9 (step S35).

If the registered password is already stored (YES in step S32), the communication control program 12a causes the LCD 15 to display the confirmation screen 400 of FIG. 13 (step S36). If the "Yes" button on the confirmation screen 400 of FIG. 13 is clicked, the communication control program 12a causes the LCD 15 to display the password registration screen of FIG. 7 (step S37). Then, the communication control program 12a executes a process of storing a password, which is entered on the password registration screen, in the registry as a new registered password, that is, a process of updating the already stored registered password to the new password which has been entered on the password registration screen (step S38). Subsequently, the communication control program 12a deletes the IDs in the connection permission list 124, and clears the connection permission list 124 (step S39). In addition, the communication control program 12a stores the present date and time as the date and time of storage of the registered password, that is, the password registration date and time, and displays the password registration date and time on the "Connection device list" tab screen of FIG. 9 (step S35). Thus, the password registration date and time displayed on the "Connection device list" tab screen of FIG. 9 is updated each time the re-registration of the password is executed.

As has been described above, according to the present embodiment, the connection permission list itself, which is stored in the electronic apparatus 10, is protected by using the password verification. Thereby, the risk of data theft can be reduced without executing special communication such as an exchange of the password between the close proximity wireless transfer device 20 and the external device. Besides, when the user wishes the communication between a device, which is not registered in the connection permission list, and the electronic apparatus 10, the user can perform data transfer between the device that is to be used and the electronic apparatus 10, simply by performing an operation of touching this device to the electronic apparatus 10 and entering the password.

In the present embodiment, the electronic apparatus 10 has been described, by way of example, as being realized as the personal computer. Alternatively, the electronic apparatus 10 may be realized as a portable device such as a mobile phone or a PDA.

The functions of the communication control program of the embodiment may also be realized as hardware modules.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a communication device configured to execute close proximity wireless transfer; and
a controller configured to restrict devices which are connectable to the communication device by using a connection permission list indicative of identifiers of one or more devices which are permitted to establish a connection for close proximity wireless transfer with the communication device,
wherein the controller is configured to determine whether an identifier of an external device in close proximity to the communication device is on the connection permission list, the identifier being wirelessly transmitted from the external device to the communication device,
wherein the controller is configured to start an operation of establishing a connection between the communication device and the external device if the identifier of the external device is on the connection permission list, and
wherein the controller is configured to display a password entry screen prompting a user of the electronic apparatus to confirm whether the external device is to be registered as a device which is permitted to establish a connection for close proximity wireless transfer with the communication device if the identifier is not on the connection permission list, and if a password entered on the password entry screen matches with a registered password, the controller is configured to add the identifier to the connection permission list to register the external device as the device which is permitted to establish a connection for close proximity wireless transfer with the communication device, and start the operation of establishing the connection between the communication device and the external device.

2. The electronic apparatus of claim 1, wherein the controller is further configured to set an operation mode of controlling the close proximity wireless transfer to either a first mode or a second mode,
wherein the controller is configured to display the password entry screen if the identifier is not on the connection permission list in the first mode, and
wherein the controller is configured to add the identifier to the connection permission list if the identifier is not on the connection permission list in the second mode.

3. The electronic apparatus of claim 2, wherein the controller is configured to display a confirmation screen which allows a user to confirm whether the device identified by the identifier is to be added to the connection permission list, if the identifier is not on the connection permission list in the second mode, and to add the identifier to the connection permission list if the user confirms that the device is to be added.

4. The electronic apparatus of claim 1, wherein the controller is further configured:
to display a password registration screen in response to a password registration request, and to store a password entered on the password registration screen as the registered password; and
to display a password registration screen if the password registration request is received in a state where the registered password is stored, to store a password entered on the password registration screen as a new registered password, and to delete identifiers on the connection permission list.

5. The electronic apparatus of claim 1, wherein the controller is further configured to restrict the registered password to comprise only numerals.

6. A communication control method of controlling close proximity wireless transfer of a communication device in an electronic apparatus, comprising:
determining whether an identifier of an external device in close proximity to the communication device is on a connection permission list the connection permission list being indicative of identifiers of one or more devices which are permitted to establish a connection for close proximity wireless transfer with the communication device, the identifier being wirelessly transmitted from the external device to the communication device;

starting an operation of establishing a connection between the communication device and the external device if the identifier is on the connection permission list;

displaying a password entry screen prompting a user of the electronic apparatus to confirm whether the external device is to be registered as a device which is permitted to establish a connection for close proximity wireless transfer with the communication device if the identifier is not on the connection permission module; and adding, if a password entered on the password entry screen matches with a registered password, the identifier to the connection permission list to register the external device as the device which is permitted to establish a connection for close proximity wireless transfer with the communication device, and starting the operation of establishing the connection between the communication device and the external device.

7. The communication control method of claim 6, further comprising setting an operation mode of controlling the close proximity wireless transfer to either a first mode or a second mode, wherein the password entry screen is displayed if the identifier is not on the connection permission list in the first mode, and wherein the identifier is added to the connection permission list if the identifier is not included in the connection permission list in the second mode.

8. The communication control method of claim 6, further comprising:

displaying a password registration screen in response to a password registration request, and storing a password entered on the password registration screen as the registered password; and displaying a password registration screen when the password registration request is received in a state where the registered password is stored, changing the stored registered password to a password entered on the password registration screen, and deleting identifiers on the connection permission list.

* * * * *